J. D. HEEBNER.
Horse Rake.
No. 68,075.
Patented Aug. 27, 1867.
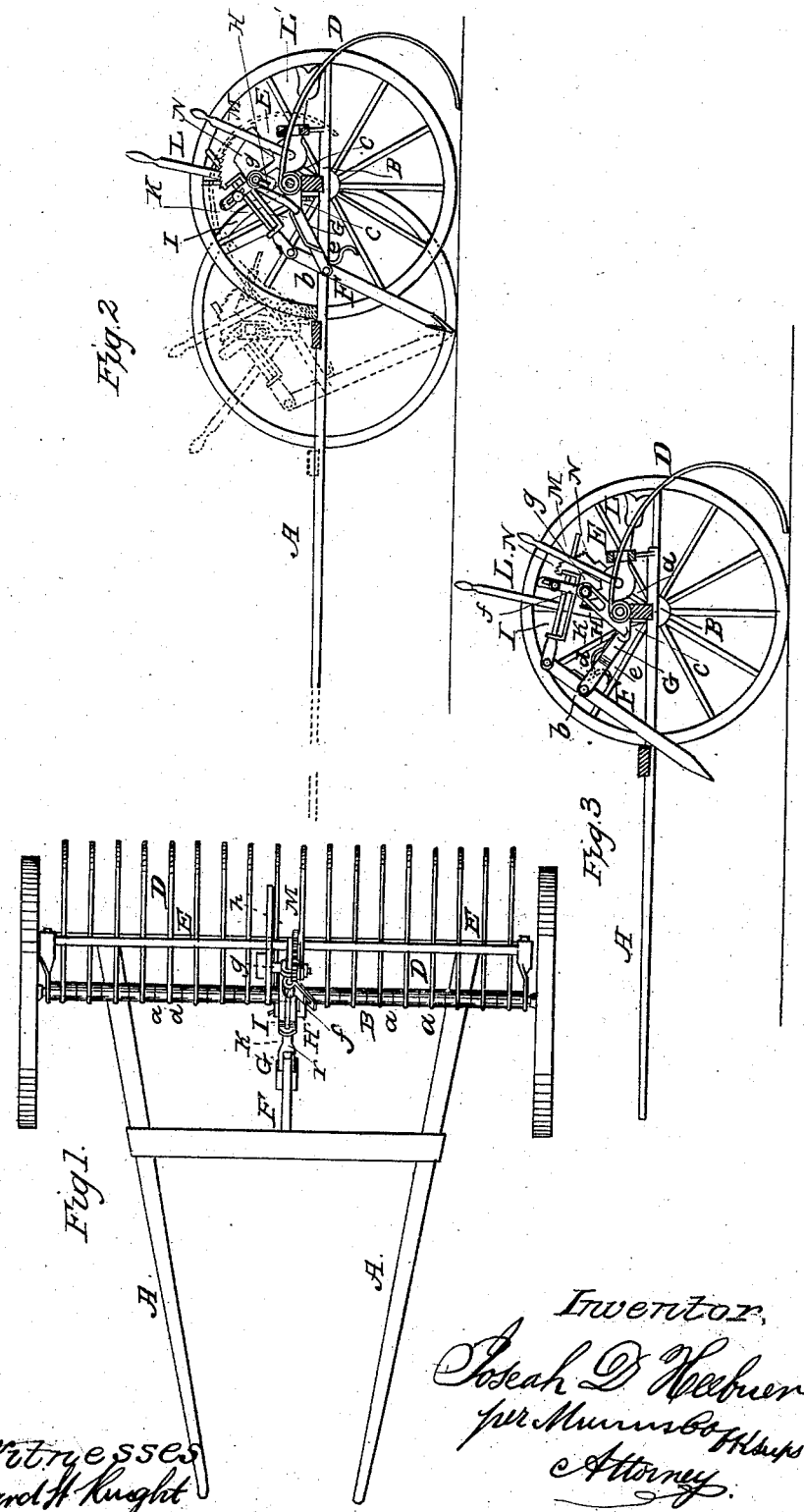

United States Patent Office.

JOSIAH D. HEEBNER, OF NORRITTONVILLE, PENNSYLVANIA, ASSIGNOR TO HIMSELF, D. S. HEEBNER, AND I. S. HEEBNER, OF SAME PLACE.

*Letters Patent No. 68,075, dated August 27, 1867.*

IMPROVEMENT IN HORSE-RAKES.

*The Schedule referred to in these Letters Patent and making part of the same.*

TO ALL WHOM IT MAY CONCERN:

Be it known that I, JOSIAH D. HEEBNER, of Norrittonville, in the county of Montgomery, and State of Pennsylvania, have invented a new and useful Improvement in Horse Hay-Rakes; and I do hereby declare the following to be a full, clear, and exact description of the same, sufficient to enable one skilled in the art to which the invention appertains to make use of it, reference being had to the accompanying drawings, which form a part of this specification, in which—

Figure 1 is a plan or top view, and

Figures 2 and 3 are vertical sections in a plane parallel to the line of draught, showing the different positions that the working parts will assume during the operation of the implement.

Parts that would be hidden are shown in blue.

The nature of my invention consists in so constructing and arranging the mechanism thereof that a light and durable machine is produced, which is automatic, or self-moving, in some of its operations, so that the attendant has but little manual labor to perform, and is enabled to bestow all the attention that is required by the nature of the ground he is on and the character of the team he has in hand. In the drawings—

A A are the shafts, and B is the axle of my horse-rake. Above the axle, and secured to it by plates, which form its bearings, is the shaft or bar C, (see figs. 2 and 3,) extending the whole length of the axle, supporting the inner ends of the rake-fingers D. The bar C is shown in blue lines in fig. 1. The fingers are each attached to the centre of a sleeve, $a$, around which they are bent, which sleeve is free to turn on the bar C, over which it is slipped when placed in position. The rake-fingers are so curved that their outer ends may assume the position best suited for their office. A bar, E, furnished with holes, through which the fingers pass, is hinged to the finger-bearing bar C at its extremities, and is the agent for raising the rake when required, as will be more fully explained. The holes in the bar E, through which the fingers pass, are properly slots, so that any of the fingers are at liberty to accommodate themselves to any ordinary inequality they may meet by rising to it without affecting any of the fingers. F is a tripping-pole, hinged at $b$ in the forked end of the arm G, connected in its turn by a joint to the axle at $c$. To the top of the tripping-pole F is jointed a horizontal rod, I, which is capable of a longitudinal motion accommodated to the motion of the upper end of the tripping-pole F to which it is attached. By means of the longitudinal motion thus imparted by the tripping-pole F, the rake is lifted at the proper intervals by the power of the horse, requiring no aid from the driver except the simple and easy operation of throwing the rake into or out of gear with the longitudinally moving rod I. The general principle of the machine is simply that the rod I should move backward and forward in connection with the tripping-pole, and should be connected with the rake by a connecting attachment, which, when in gear with the rod I, shall lift the rake at every forward movement of the rod I, but when out of gear shall permit a forward movement of the rod I without lifting the rake. This may be accomplished in a variety of ways. In the drawings, a machine is represented in which the arrangement by which the rod I operates the rake is as follows: The rod I slides in bearings in lugs at the ends of the carriage K. It has also a partial rotary movement upon its own axis, and carries a pawl, $f$, fast upon it, which engages in a detaining notch or depression in the bed of the carriage K. The pawl $f$ has a trigger, $f'$, made adjustable by a slot and set-screw, by which it is disengaged from or lifted out of the notch in the carriage K. The rod I and its pawl $f f'$ are kept in a direction to insure the action of the pawl in engaging by a spiral spring in the swivel head, by which it is jointed to the top of the tripping-pole F. The spring $d$ in the arm G, by its action on the tripping-pole, causes the rod I to slide in its bearings, so that its pawl shall not fail to reach the notch in the carriage K. The carriage K vibrates on an arbor, $g$, firmly secured at one end to an arm of the bell-crank lever L, and projecting at the other end through the slot in the arm H, where it is kept by a head. The bell-crank lever L has its fulcrum on the bearing-bar C, and at its lower rear extremity has a counterpoise, L'. It also carries on its lower limb an arbor, which is the fulcrum of the lever M. This lever has upon it a pawl or detent, $h$, the office of which is to engage at the proper time with the segment ratchet N, fixed to and forming part of the carriage K, so as to keep the tripping-pole up, as shown in fig. 3. The driver is supposed to occupy a seat (not shown) so placed as to give him command of the levers L and M, which are near each other, and at or near the centre of the distance between the wheels.

The operation of my horse-rake is as follows: The machine being at rest, and in the position shown in black, in fig. 2, the lever L is brought forward towards the horse; this raises the rake-fingers off the ground by means of the bar E, which is lifted by means of the lower limb L' of the lever L. At the same time the fulcrum of the lever M is also raised, the carriage K, with its arbor $g$, is brought forward, the top of the tripping-pole is pushed also forward, and its foot being against the ground, the machinery is finally brought into the position shown in red in fig. 2, the detent on the lever M having travelled up along the segment ratchet N, where it will engage as soon as the forward movement of the lever L ceases. Now, by a backward movement of the lever L, the rake-fingers may approach the ground, which they will do by their own weight, lifting the tripping-pole F clear off the ground, through the engagement of the lever M with the ratchet N, so that the machine is in the position shown in fig. 3, which is that in which it is ready for raking. The lever L may be held in a position which will permit the machine to be wheeled along without allowing either the rake or tripping-pole to come in contact with the ground, as when it is necessary, say in transportation to the field of labor. When the rake has become charged with the results of its labor, and it is desired to empty it, the driver, by a backward motion of the lever M, disengages it from the ratchet N. Instantaneously the tripping-pole and other devices assume again the position shown in black in fig. 2. The tripping-pole F catches against the ground, and as the machine moves on, the pole F assumes an upright position, the front end of the carriage K is raised, and its rear is depressed, the ratchet N allows the detent on the lever M to pass up along its teeth, the arbor $g$ falls in the slot in the arm H, forcing the lever L forward, and raising the rake, as before, by means of the bar E, which is lifted by the lower limb L' of the bell-crank L. In this movement it will be seen that the tripping-pole becomes a lever of great power, having its fulcrum at its point, the power applied at the point $b$, and the force resulting in the lifting of the rake clear of the ground, as before described. The rake is now lifted, as seen in red, fig. 2, and has been emptied in a distance equal to the radius of the wheels from where the driver disengaged the lever M. A little further movement depresses the arbor $g$ in the slot of the arm H, until the trigger $f'$ of the pawl $f$ is pushed up by the head of the arm H, relieving the carriage K from its restraint through the hold the tripping-pole has in the ground. The carriage is pulled down to the rear by the weight of the rake acting through the lever M and ratchet N, no longer held by the pawl $f$. The leverage increases by the raising of the arbor $g$ in the slot of the arm H, and the spring $d$, forcing the foot of the tripping-pole to the front, it is lifted entirely up by the downward motion of the rake, and again is in readiness to proceed to fill the rake, to be again emptied by another pull at the lever M. It will be seen that the machine puts itself in readiness to load itself after having been emptied by simply pulling the lever M. The lever L is only used in transportation, or when it is necessary to move the rake over an obstacle, such as loose rails, &c. The machine is unloaded and makes itself ready for another load in less than the quarter of a revolution of one of its wheels.

I do not intend to limit myself to the particular form of horizontal bar I shown here in the drawings, and to the means by which it operates the rake, for, as I have before said, a great many devices could be constructed by which the motion derived from the tripping-pole F by the horizontal bar I might be communicated to the rake to effect the desired purpose. I wish to be free to use any form of horizontal bar which, operated by the tripping-pole, shall lift or drop the rake at the proper moment, and leave others to vary the mechanism between the bar I and the rake, by which the latter is connected with the former. Neither do I wish to limit myself to the segment ratchet upon the end of the carriage K, but may use any kind of ratchet, or even a tooth or a shoulder only, upon the rear end of the carriage K or the rod I, engaging with a slot, trigger, or shoulder upon the lever M. I may use the arm G either with or without the spring $d$, and the tripping-pole F either with or without the cam or toe $e$. I may also dispense with the use of the spring fixed to the rod I where it joints to the pole F. I may also joint the rear end of the arm G to the axle, to the shaft C, or to the frame.

Having described my invention, what I claim as new, and desire to secure by Letters Patent, is—

1. The combination and arrangement of the tripping-pole F, pivoted between its extremities, with the arm G and the horizontal rod I, substantially as herein shown and described.

2. The lever M, having a shoulder engaging at the proper time with the carriage K or the rod I, substantially as and for the purpose specified.

To the above specification of my improved horse hay-rake I have signed my hand this 22d of August, 1866.

JOSIAH D. HEEBNER.

Witnesses:
EDWARD H. KNIGHT,
SOLON C. KEMON.